US 8,278,492 B2

(12) United States Patent
Myllyoja et al.

(10) Patent No.: US 8,278,492 B2
(45) Date of Patent: *Oct. 2, 2012

(54) PROCESS FOR THE MANUFACTURE OF DIESEL RANGE HYDROCARBONS

(75) Inventors: Jukka Myllyoja, Vantaa (FI); Pekka Aalto, Porvoo (FI); Elina Harlin, Vantaa (FI)

(73) Assignee: Neste Oil Oyj, Espoo (FI)

( * ) Notice: Subject to any disclaimer, the term of this patent is extended or adjusted under 35 U.S.C. 154(b) by 985 days.

This patent is subject to a terminal disclaimer.

(21) Appl. No.: 11/477,921

(22) Filed: Jun. 30, 2006

(65) Prior Publication Data

US 2007/0006523 A1   Jan. 11, 2007
US 2010/0287821 A9   Nov. 18, 2010

Related U.S. Application Data

(60) Provisional application No. 60/695,852, filed on Jul. 5, 2005.

(51) Int. Cl.
*C10L 1/08* (2006.01)
(52) U.S. Cl. ........... 585/240; 585/241; 585/242; 44/307
(58) Field of Classification Search ............... 44/354, 44/307, 308; 208/89, 111, 107, 46; 585/739, 585/528, 532, 750, 467, 240, 241, 242
See application file for complete search history.

(56) References Cited

U.S. PATENT DOCUMENTS

| | | | |
|---|---|---|---|
| 4,049,686 A | 9/1977 | Ringers et al. | |
| 4,518,485 A * | 5/1985 | LaPierre et al. | ........... 208/89 |
| 4,554,397 A | 11/1985 | Stern et al. | |
| 4,992,403 A * | 2/1991 | Takahashi et al. | ........... 502/164 |
| 4,992,605 A * | 2/1991 | Craig et al. | ........... 585/240 |
| 5,183,556 A | 2/1993 | Reilly et al. | |
| 5,705,722 A | 1/1998 | Monnier et al. | |
| 5,888,376 A * | 3/1999 | Wittenbrink et al. | ........... 208/59 |
| 2004/0230085 A1 | 11/2004 | Jakkula et al. | |
| 2005/0060929 A1* | 3/2005 | Caprotti et al. | ........... 44/354 |
| 2006/0112614 A1* | 6/2006 | Davenport et al. | ........... 44/459 |

FOREIGN PATENT DOCUMENTS

| | | |
|---|---|---|
| EP | 1 396 531 A2 | 3/2004 |
| EP | 1396531 A2 * | 3/2004 |
| EP | 1 489 157 A1 | 12/2004 |
| FI | 100248 B | 10/1997 |
| FR | 2 607 803 A2 | 10/1988 |
| JP | 2003-171670 A | 6/2003 |

(Continued)

OTHER PUBLICATIONS

Schmidt et al., Society of Automotive Engineers, Inc., Paper 961086, pp. 113-123, (1996).

(Continued)

*Primary Examiner* — Ellen McAvoy
*Assistant Examiner* — Latosha Hines
(74) *Attorney, Agent, or Firm* — Birch, Stewart, Kolasch & Birch, LLP

(57) ABSTRACT

The invention relates to a process for the manufacture of diesel range hydrocarbons wherein a feed comprising fresh feed is hydrotreated in a hydrotreating step and isomerized in an isomerization step and the fresh feed contains at least 20% by weight triglyceride $C_{12}$-$C_{16}$ fatty acids or $C_{12}$-$C_{16}$ fatty acid esters or $C_{12}$-$C_{16}$ fatty acids or combinations of thereof and feed contains 50-20000 w-ppm sulphur calculated as elemental sulphur.

24 Claims, 1 Drawing Sheet

FOREIGN PATENT DOCUMENTS

WO      WO 92/16601 A1    10/1992

OTHER PUBLICATIONS

Maier et al., Hydorgenolysis, IV, Chem. Ber., vol. 115, No. 2, pp. 808-812, (1982).

Laurent et al., Applied Catalysis A: General, vol. 109, No. 1, pp. 77-96 & 97-115, (1994).

Office Action mailed Sep. 21, 2007 in co-pending application U.S. Appl. No. 11/477,922.

Office Action mailed Sep. 12, 2008 in co-pending U.S. Appl. No. 11/477,922.

Office Action mailed Jun. 18, 2009 in co-pending U.S. Appl. No. 11/477,922.

English translation of the Japanese Office Action for Application No. 518886/2008 dated Dec. 21, 2010.

Advisory Action, dated Jun. 17, 2010, for U.S. Appl. No. 11/477,922.

Embong et al., "Sulfur Content of Crude Rapeseed Oil from Aqueous Extraction," JAOCS, Feb. 1980, pp. 75-76.

Office Action, dated Aug. 19, 2010, for U.S. Appl. No. 11/477,922.

Office Action, dated Feb. 5, 2010, for U.S. Appl. No. 11/477,922.

Billon, A. et al., Fuels: new approaches. Viewpoint of and proposed solutions from the French Petroleum Institute, 1994, Petroe et Techniques, 388, 23-45 (1 page abstract).

Froment, G.F. et al., Hydrotreatment and hydrocracking of oil fractions, 1997, Elsevier Science Ltd, 6th European workshop, Oostende, Belgium, (4 pages).

Office Action, dated Sep. 15, 2011, in co-pending U.S. Appl. No. 13/107,146.

* cited by examiner

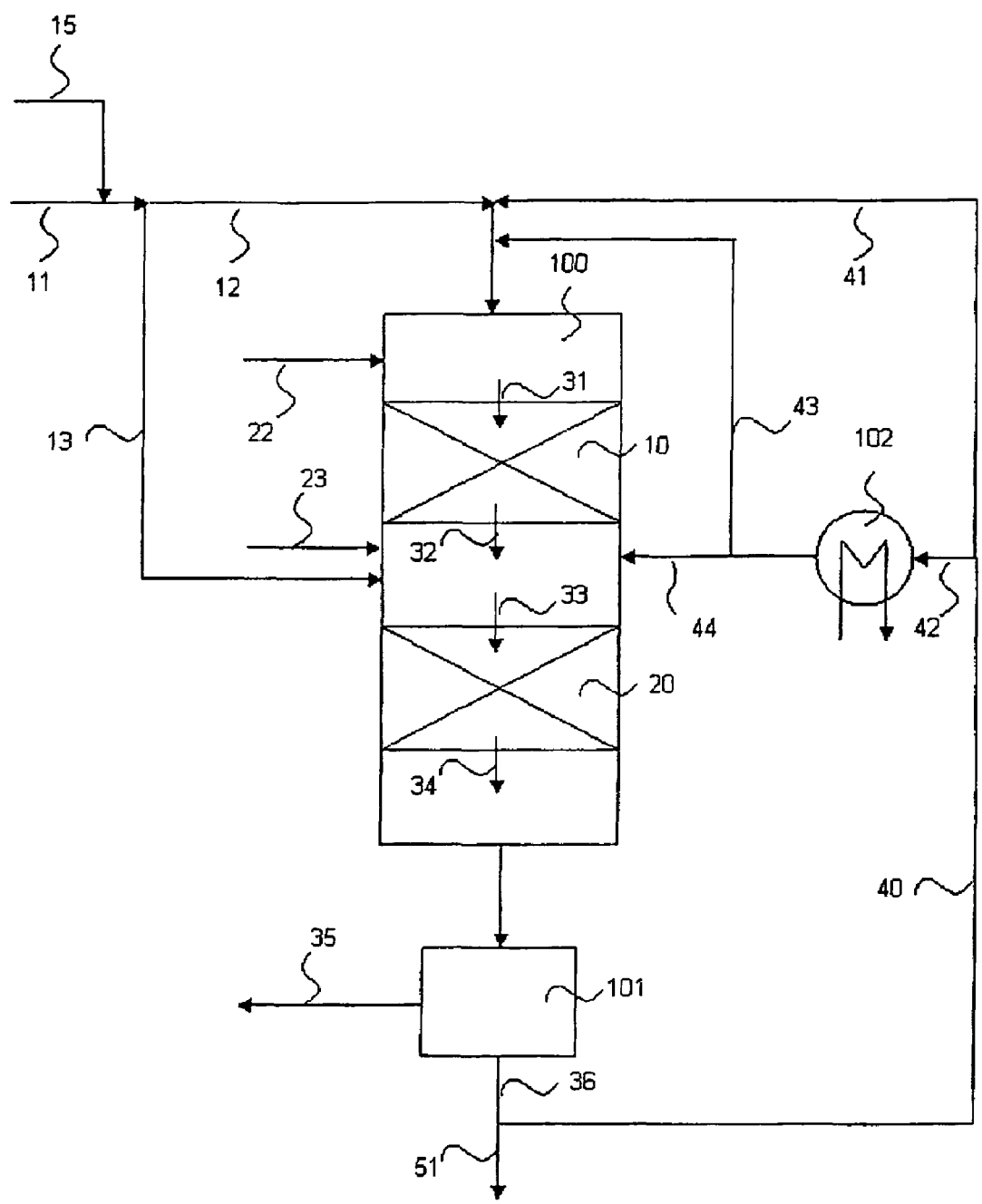

PROCESS FOR THE MANUFACTURE OF DIESEL RANGE HYDROCARBONS

FIELD OF THE INVENTION

The invention relates to an improved process for the manufacture of diesel range hydrocarbons from bio oils and fats with reduced hydrogen consumption. Particularly the invention relates to an improved process for the manufacture of diesel range hydrocarbons with high selectivity and which process yields a product with improved cold flow properties concurrently without decreasing diesel yield during isomerisation.

BACKGROUND OF THE INVENTION

Environmental interests and an increasing demand for diesel fuel, especially in Europe, encourage fuel producers to employ more intensively renewable sources available. In the manufacture of diesel fuel based on biological raw materials the main interest has concentrated on vegetable oils and animal fats comprising triglycerides of fatty acids. Long, straight and mostly saturated hydrocarbon chains of fatty acids correspond chemically to the hydrocarbons present in diesel fuels. However, neat vegetable oils display inferior properties, particularly extreme viscosity and poor stability and therefore their use in transportation fuels is limited.

Conventional approaches for converting vegetable oils or other fatty acid derivatives into liquid fuels comprise processes such as transesterification, catalytic hydrotreatment, hydrocracking, catalytic cracking without hydrogen and thermal cracking. Typically triglycerides, forming the main component in vegetable oils, are converted into the corresponding esters by the transesterification reaction with an alcohol in the presence of catalysts. The obtained product is a fatty acid alkyl ester, most commonly fatty acid methyl ester (FAME). Poor low-temperature properties of FAME however limit its wider use in regions with colder climatic conditions. Poor cold flow properties are a result of the straight chain nature of the FAME molecule and thus double bonds are needed in order to create even bearable cold flow properties. Carbon-carbon double bonds and ester groups however decrease the stability of fatty acid esters, which is a major disadvantage of transesterification technology. Further, Schmidt, K., Gerpen J. V.: SAE paper 961086 teaches that the presence of oxygen in esters results in undesired and higher emissions of $NO_x$ in comparison to conventional diesel fuels.

Undesired oxygen may be removed from fatty acids or esters by deoxygenation reactions. The deoxygenation of bio oils and fats, which mean oils and fats based on biological material, to hydrocarbons suitable as diesel fuel products, may be carried out in the presence of a catalyst under controlled hydroprocessing conditions, known as hydrotreating or hydrocracking processes.

During hydrodeoxygenation oxogroups are reacted with hydrogen and removed through formation of water. The hydrodeoxygenation reaction requires relatively high amounts of hydrogen. Due to the highly exothermic reactions the control of reaction heat is extremely important. Unnecessary high reaction temperature, insufficient control of reaction temperature or unnecessary low hydrogen availability in the feed stream cause increased formation of unwanted side reaction products and coking of catalyst. Unwanted side reactions, such as cracking, polymerisation, ketonisation, cyclisation and aromatisation decrease the yield and the properties of diesel fraction. Unsaturated feeds and free fatty acids in triglyceridic bio oils may also promote the formation of heavy molecular weight compounds.

U.S. Pat. No. 4,992,605 and U.S. Pat. No. 5,705,722 describe processes for the production of diesel fuel additives by conversion of bio oils into saturated hydrocarbons under hydroprocessing conditions with NiMo and CoMo catalysts. The hydrotreatment operates at high temperatures of 350-450° C. and produces n-paraffins and other hydrocarbons. The product has high cetane number but poor cold properties, which limit the amount of product that can be blended in conventional diesel fuel in summer time and prevent its use during winter time. The formation of heavy compounds with a boiling point above 343° C. was observed, especially when a fatty acid fraction was used as a feed. A lower limit of 350° C. for reaction temperature was concluded as a requirement for trouble-free operation.

A two-step process is disclosed in FI 100248 for producing middle distillates from vegetable oils by hydrogenating fatty acids or triglycerides of vegetable oil origin using commercial sulphur removal catalysts, such as NiMo and CoMo, to give n-paraffins, followed by isomerizing said n-paraffins using metal containing molecule sieves or zeolites to obtain branched-chain paraffins. The hydrotreating was carried out at rather high reaction temperatures of 330-450° C., preferably 390° C. Hydrogenating fatty acids at those high temperatures leads to shortened catalyst life resulting from coking and formation of side products.

EP 1 396 531 describes a process containing at least two steps, the first one being a hydrodeoxygenation step and the second one being a hydroisomerisation step utilizing counter-current flow principle, and biological raw material containing fatty acids and/or fatty acid esters serving as the feedstock. The process comprises an optional stripping step.

Cracking is significant side reaction in isomerisation of n-paraffins. Cracking increases with higher isomerisation conversion (more severe reaction conditions) and decrease the yield of diesel. The severity of isomerisation conditions (isomerisation conversion) controls also the amount of methyl branches formed and their distance from each other and therefore cold properties of bio diesel fraction produced.

FR 2,607,803 describes a process for hydrocracking of vegetable oils or their fatty acid derivatives under elevated pressure to give hydrocarbons and to some extent acid. The catalyst contains metal dispersed on a support. A high reaction temperature of 370° C. did not result in complete conversion and high selectivity of n-paraffins. The product formed contained also some intermediate fatty acid compounds.

Water formation during hydrotreatment mainly results from deoxygenation of triglyceride oxygen by the means of hydrogen (hydrodeoxygenation). Deoxygenation using hydrodeoxygenation conditions is to some extent accompanied by decarboxylation reaction path, described below as reaction A, and decarbonylation reaction path (reaction B1 and B2). Deoxygenation of fatty acid derivatives by decarboxylation and/or decarbonylation reactions forms carbon oxides ($CO_2$ and CO) and aliphatic hydrocarbon chains with one carbon atom less than in the original fatty acid molecule. Thereafter water-gas-shift reaction may balance the concentrations of CO and $CO_2$ (reaction E). Methanation reaction uses hydrogen and forms $H_2O$ and methane if it is active during hydrotreatment conditions (reaction D). Hydrogenation of fatty acids gives aliphatic hydrocarbons and water (reaction C). Reaction schemes A-E are described below.

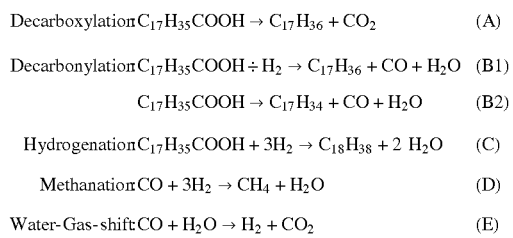

$$\text{Decarboxylation } C_{17}H_{35}COOH \rightarrow C_{17}H_{36} + CO_2 \quad (A)$$

$$\text{Decarbonylation } C_{17}H_{35}COOH + H_2 \rightarrow C_{17}H_{36} + CO + H_2O \quad (B1)$$

$$C_{17}H_{35}COOH \rightarrow C_{17}H_{34} + CO + H_2O \quad (B2)$$

$$\text{Hydrogenation } C_{17}H_{35}COOH + 3H_2 \rightarrow C_{18}H_{38} + 2\,H_2O \quad (C)$$

$$\text{Methanation } CO + 3H_2 \rightarrow CH_4 + H_2O \quad (D)$$

$$\text{Water-Gas-shift } CO + H_2O \rightarrow H_2 + CO_2 \quad (E)$$

The feasibility of decarboxylation varies greatly with the type of carboxylic acid or derivative thereof used as the starting material. Alpha-hydroxy, alpha-carbonyl and dicarboxylic acids are activated forms and they are more easily deoxygenated by decarb-reactions, which mean here decarboxylation and/or decarbonylation. Linear aliphatic acids are not activated this way and generally they are difficult to deoxygenate through the decarb-reaction path and they need much more severe reaction conditions.

Decarboxylation of carboxylic acids to hydrocarbons by contacting carboxylic acids with heterogeneous catalysts was suggested by Maier, W. F. et al: Chemische Berichte (1982), 115(2), 808-12. Maier et al tested Ni/Al$_2$O$_3$ and Pd/SiO$_2$ catalysts for decarboxylation of several carboxylic acids. During the reaction the vapors of the reactant were passed through a catalytic bed together with hydrogen. Hexane represented the main product of the decarboxylation of the tested compound heptanoic acid.

U.S. Pat. No. 4,554,397 discloses a process for the manufacture of linear olefins from saturated fatty acids or esters, suggesting a catalytic system consisting of nickel and at least one metal selected from the group consisting of lead, tin and germanium. With other catalysts, such as Pd/C, low catalytic activity and cracking to saturated hydrocarbons, or formation of ketones when Raney-Ni was used, were observed.

Decarboxylation, accompanied with hydrogenation of oxo-compound, is described in Laurent, E., Delmon, B.: Applied Catalysis, A: General (1994), 109(1), 77-96 and 97-115, wherein hydrodeoxygenation of biomass derived pyrolysis oils over sulphided CoMo/γ-Al2O3 and NiMo/γ-Al2O3 catalysts was studied. Diethyldecanedioate was used among others as a model compound and it was observed that the rates of formation of the decarboxylation product, nonane and the hydrogenation product, decane were comparable under hydrotreating conditions (260-300° C., 7 MPa, in hydrogen). The presence of hydrogen sulphide (H$_2$S) in feed promoted the decarboxylation selectivity compared with zero sulphur in feed. Different sulphur levels studied however had no effect on the decarboxylation selectivity of diethyldecanedioate.

Biological raw materials often contain several impurities, such as metal compounds, organic nitrogen, sulphur and phosphorus compounds, which are known catalyst inhibitors and poisons inevitably reducing the service life of catalysts and necessitating more frequent catalyst regeneration or change. Metals in bio oils/fats inevitable build up on catalyst surface and change the activity of catalyst. Metals can promote some side reactions and blocking of active sites of catalysts typically decreases the activity.

Fatty acid composition, size and saturation degree of the fatty acid may vary considerably in feedstock of different origin. Melting point of bio oil or fat is mainly consequence of saturation degree. Fats are more saturated than liquid oils and in this respect need less hydrogen for hydrogenation of double bonds. Double bonds in fatty acid chains contribute also to different kinds of side reactions, such as oligomerisation/polymerization, cyclisation/aromatisation and cracking reactions, which deactivate catalyst, increase hydrogen consumption and reduce diesel yield.

Hydrolysis of triglycerides produces also diglycerides and monoglycerides, which are partially hydrolyzed products. Diglycerides and monoglycerides are surface-active compounds, which can form emulsions and make liquid/liquid separations of water and oil more difficult. Bio oils and fats can also contain other glyceride-like surface-active impurities like phospholipids, suck as lecithin, which have phosphorus in their structures. Phospholipids are gum like materials, which can be harmful for catalysts. Natural oils and fats also contain non-glyceride components. These are among others waxes, sterols, tocopherols and carotenoids, some metals and organic sulphur compounds as well as organic nitrogen compounds. These compounds can be harmful for catalysts or pose other problems in processing.

Plant oils/fats and animal oils/fat may contain free fatty acids, which are formed during processing of oils and fats through hydrolysis of triglycerides. Free fatty acids are a class of problematic components in bio oils and fats, their typical content being between 0 and 30% by weight. Free fatty acids are corrosive in their nature, they can attack the materials of the process unit or catalyst and they can promote side reactions like formation of metal carboxylates in the presence of metal impurities. Due to the free fatty acids contained in bio oils and fats, the formation of heavy molecular weight compounds is significantly increased when compared to triglyceridic bio-feedstock having only low amounts of free fatty acids, typically below 1% by weight.

Deoxygenation of plant oils/fats and animal oils/fats with hydrogen requires rather much hydrogen and at the same time releases significant amount of heat. Heat is produced from the deoxygenation reactions and from double bond hydrogenation. Different feedstocks produce significantly different amounts of reaction heat. The variation in reaction heat produced is mainly dependent of double bond hydrogenation. The average amount of double bonds per triglyceride molecule can vary from about 1.5 to over 5 depending on the source of bio oil or fat.

OBJECT OF THE INVENTION

An object of the invention is an improved process for the manufacture of diesel range hydrocarbons from bio oils and fats with reduced hydrogen consumption.

A further object of the invention is an improved process for the manufacture of diesel range hydrocarbons from bio oils and fats with high selectivity and which process yields a product with improved cold flow properties concurrently without decreasing diesel yield during isomerisation.

A further object of the invention is an improved process for the manufacture of high quality diesel range hydrocarbons from bio oils and fats with decreased hydrogen consumption and high diesel yield.

Characteristic features of the process according to the invention are provided in the claims.

DEFINITIONS

Here hydroprocessing is understood as catalytic processing of organic material by all means of molecular hydrogen.

Here hydrotreatment is understood as a catalytic process, which removes oxygen from organic oxygen compounds as water (hydrodeoxygenation, HDO), sulphur from organic sulphur compounds as dihydrogen sulphide (H$_2$S) (hydrodesulphurisation, HDS), nitrogen from organic nitrogen compounds as ammonia ($NH_3$) (hydrodenitrogenation, HDN) and halogens, such as chloride from organic chloride compounds as hydrochloric acid (HCl) (hydrodechlorination, HDCl), typically under the influence of a sulphided NiMo or sulphided CoMo catalysts.

Here deoxygenation is understood to mean removal of oxygen from organic molecules, such as fatty acid derivatives, alcohols, ketones, aldehydes or ethers by any means previously described.

Here hydrodeoxygenation (HDO) of triglycerides or other fatty acid derivatives or fatty acids is understood to mean the removal of carboxyl oxygen as water by the means of molecular hydrogen under the influence of a catalyst.

Here decarboxylation and/or decarbonylation of triglycerides or other fatty acid derivatives or fatty acids is understood to mean removal of carboxyl oxygen as $CO_2$ (decarboxylation) or as CO (decarbonylation) with or without the influence of molecular hydrogen. Decarboxylation and/or decarbonylation reactions are referred to as decarb-reactions.

Here hydrocracking is understood as catalytic decomposition of organic hydrocarbon materials using molecular hydrogen at high pressures.

Here hydrogenation means saturation of carbon-carbon double bonds by the means of molecular hydrogen under the influence of a catalyst.

Here n-paraffins mean normal alkanes or linear alkanes that do not contain side chains.

Here isoparaffins means alkanes having one or more $C_1$-$C_9$, typically $C_1$-$C_2$ alkyl side chains, typically mono-, di-, tri- or tetramethylalkanes.

The feed (total feed) to the hydrotreatment step is to be understood comprising fresh feed and optionally at least one dilution agent.

BRIEF DESCRIPTION OF THE DRAWINGS

FIG. 1 depicts a hydrotreatment process configuration.

SUMMARY OF THE INVENTION

The present invention relates to an improved process comprising a hydrotreatment step and an isomerisation step, for the manufacture of diesel range hydrocarbons from renewable sources like bio oils and fats, such as plant oils/fats and animal and fish oils/fats, particularly $C_{12}$-$C_{16}$ fatty acids and/or derivatives thereof in the presence of sulphur. The invention relates to hydrotreating of the feed comprising triglycerides, fatty acids and derivatives of fatty acids and particularly $C_{12}$-$C_{16}$ fatty acids and/or derivatives thereof or combinations of thereof, into n-paraffins with reduced hydrogen consumption during hydrotreating, in the presence of sulphur, followed by converting the n-paraffins into diesel range branched alkanes using isomerisation with high diesel yield. The hydrocarbon oil product formed via this method is a high quality diesel component. In the hydrotreating step the feed is contacted with a sulphided hydrotreatment catalyst in the presence of sulphur, followed by the isomerisation step with an isomerisation catalyst.

DETAILED DESCRIPTION OF THE INVENTION

It was surprisingly found that hydrogen consumption in the hydrotreatment step, deoxygenation of fatty acids and/or fatty acid derivatives, and cracking during isomerisation of n-paraffins can be significantly reduced by adding one or more sulphur compounds to the feed to achieve sulphur content of 50-20000 w-ppm, preferably 1000-8000 w-ppm, most preferably 2000-5000 w-ppm in the feed, calculated as elemental sulphur, particularly when bio oils and fats comprising $C_{12}$-$C_{16}$ fatty acids and/or derivatives thereof are used as the fresh feed for the hydrotreatment step.

Feedstock

The bio oil and/or fat used as the fresh feed in the process of the present invention originates from renewable sources, such as fats and oils from plants and/or animals and/or fish and compounds derived from them. The basic structural unit of a typical plant or vegetable or animal oil/fat useful as the feedstock is a triglyceride, which is a triester of glycerol with three fatty acid molecules, having the structure presented in the following formula I:

Structure of triglyceride

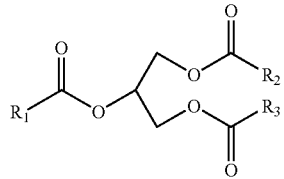

Formula 1

In formula I $R_1$, $R_2$ and $R_3$ are alkyl chains. Fatty acids found in natural triglycerides are almost solely fatty acids of even carbon number. Therefore $R_1$, $R_2$, and $R_3$ typically are $C_5$-$C_{23}$ alkyl groups, mainly $C_{11}$-$C_{19}$ alkyl groups and most typically $C_{15}$ or $C_{17}$ alkyl groups. $R_1$, $R_2$, and $R_3$ may contain carbon-carbon double bonds. These alkyl chains can be saturated, unsaturated or polyunsaturated. Suitable bio oils are plant and vegetable oils and fats, animal fats, fish oils, and mixtures thereof containing fatty acids and/or fatty acid esters. Examples of said materials are wood-based and other plant-based and vegetable-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above.

Typically a bio oil or fat, suitable as feedstock, comprises $C_{12}$-$C_{24}$ fatty acids, derivatives thereof such as anhydrides or esters of fatty acids as well as triglycerides of fatty acids or combinations of thereof. The fatty acids or fatty acid derivatives, such as esters may be produced via hydrolysis of bio oils or by their fractionalization or esterification reactions of triglycerides.

In the process according to the invention the fresh feed contains at least 20%, preferably at least 30% and most preferably at least 40% by weight of triglyceride $C_{12}$-$C_{16}$ fatty acids or $C_{12}$-$C_{16}$ fatty acid esters or $C_{12}$-$C_{16}$ fatty acids or combinations of thereof. Examples of this kind of feed are palm oils and animal fats containing lower carbon numbers fatty acids, which are typically more saturated than $C_{18}$ fatty acids and their decarboxylation tendency is lower than that of higher carbon number fatty acids during hydrodeoxygenation. The fresh feed may also comprise feedstock of biological origin and a hydrocarbon or hydrocarbons.

$C_{12}$-$C_{16}$ fatty acids can be bound to glycerol as triglycerides or other esters. Animal fats and palm oil triglycerides contain significant amounts of $C_{16}$ fatty acids, typically 15-45 wt-% and especially palmitic acid. Other vegetable triglycerides contain only 1-13 wt-% $C_{16}$ fatty acids, for example rapeseed oil only 1-5 wt-%.

In order to avoid catalyst deactivation and undesired side reactions the feed shall comply with the following requirements: The amount of alkaline and alkaline earth metals, calculated as elemental alkaline and alkaline earth metals, in the feed is below 10, preferably below 5 and most preferably below 1 w-ppm. The amount of other metals, calculated as elemental metals, in the feed is below 10, preferably below 5 and most preferably below 1 w-ppm. The amount of phosphorus, calculated as elemental phosphorus is below 30, preferably below 15 and most preferably below 5 w-ppm.

In many cases the feedstock, such as crude plant oil or animal fat, is not suitable as such for processing because of high impurity content and thus the feedstock is preferably purified using suitable one or more conventional purification procedures, before introducing it to the hydrotreating step of the process. Examples of some conventional procedures are provided in the following.

Degumming of plant oils/fats and animal oils/fats means removal of phosphorus compounds, such as phospholipids. Solvent extracted vegetable oils contain often significant amounts of gums, typically 0.5-3% by weight, which are mostly phosphatides (phospholipids) and therefore a degumming stage is needed for crude plant oils and animal fats in order to remove phospholipids and metals present in crude oils and fats. Iron and also other metals may be present in the form of metal-phosphatide complexes. Even a trace amount of iron is capable of catalysing oxidation of the oil or fat.

Degumming is performed by washing the feed at 90-105° C., 300-500 kPa(a), with $H_3PO_4$, NaOH and soft water and separating the formed gums. A major amount of metal components, which are harmful for the hydrotreatment catalyst, are also removed from the feedstock during the degumming stage. The moisture content of the degummed oil is reduced in dryer at 90-105° C., 5-50 kPa(a).

The amount of free fatty acids present in vegetable oils is typically 1-5 wt % and in animal fat 10-25 wt-%. High amounts of free fatty acids in a feedstock may be reduced using a deacidification stage, which may be performed for example by steam stripping. A feedstock, which is optionally degummed, is typically first degassed under 5-10 kPa(a) pressure at a temperature of approx. 90° C. Thereafter the obtained oil is heated to approx. 250-280° C., 5-10 kPa(a) and directed to a stripping column, where life steam strips at 230-260° C. the free fatty acids and deodorizes the oil under vacuum. The fatty acid fraction is withdrawn from the column overhead.

A feedstock, which is optionally degummed or refined in another conventional way, may be bleached. In bleaching the degummed or refined feedstock is heated and mixed with natural or acid-activated bleaching clay. Bleaching removes various impurity traces left from other pretreatment steps like degumming, such as chlorophyll, carotenoids, phospholipids, metals, soaps and oxidation products. Bleaching is typically carried out under vacuum to minimize possible oxidation. Bleaching is used to reduce the color pigments in order to produce an oil of acceptable color and to reduce the oxidation tendency of oil.

In the following the process according to the invention comprising a hydrotreating step and an isomerisation step is described in more detail.

Hydrotreating Step

The feed to the hydrotreating unit comprises fresh feed and optionally at least one diluting agent. The diluting agent can be a hydrocarbon of biological origin and/or non biological origin. In the case the feed comprises additionally at least one diluting agent it is preferable that the feed contains less than 20 wt-% of fresh feed.

The diluting agent can also be recycled product from the process (product recycle) and then the diluting agent/fresh feed-ratio is 5-30:1, preferably 10-30:1 and most preferably 12-25:1.

The total feed comprising fresh feed containing at least 20%, preferably at least 30% and most preferably at least 40% by weight of triglyceride $C_{12}$-$C_{16}$ fatty acids or $C_{12}$-$C_{16}$ fatty acid esters or $C_{12}$-$C_{16}$ fatty acids or combinations of thereof, is hydrotreated in the presence of hydrogen with a catalyst at hydrotreating conditions in the presence of 50-20000 w-ppm, preferably 1000-8000 w-ppm, most preferably 2000-5000 w-ppm of sulphur in the total feed, calculated as elemental sulphur.

In the hydrotreating step of the process fatty acids, triglycerides and fatty acid derivatives are deoxygenated, denitrogenated, desulphurisated and dechlorinated.

In the hydrotreating step, known hydrogenation catalysts containing metals from Group VIII and/or VIB of the Periodic System may be used. Preferably, the hydrogenation catalysts are supported Pd, Pt, Ni, NiMo or a CoMo catalysts, the support being alumina and/or silica, as described for instance in FI 100248. Typically, NiMo/$Al_2O_3$ and CoMo/$Al_2O_3$ catalysts are used.

In the hydrotreating step, the pressure range can be varied between 2 and 15 MPa, preferably between 3 and 10 MPa and most preferably between 4 and 8 MPa, and the temperature between 200 and 400° C., preferably between 250 and 350° C. and most preferably 280-345° C.

It was found that the deoxygenation of starting materials originating from renewable sources can be controlled between two partially alternative reaction routes: hydrodeoxygenation and decarboxylation and/or decarbonylation (decarb-reactions). The selectivity of decarb-reactions and the deoxygenation through decarb-reactions can be promoted during hydrotreating over the hydrotreatment catalyst, by using sulphur content of 50-20000 w-ppm in the total feed. The specific sulphur content in the feed is able to double the extent of n-paraffins formed by removal of COx. Complete deoxygenation of triglycerides by decarb-reactions can theoretically lower the consumption of hydrogen about 60% (max) compared with pure deoxygenation by hydrogen as can be seen in Table 3.

At least one organic or inorganic sulphur compound may be fed along with hydrogen or with the feed to achieve the desired sulphur content. The inorganic sulphur compound can be for example $H_2S$ or elemental sulphur or the sulphur compound may be an easily decomposable organic sulphur compound such as dimethyl disulphide, carbon disulphide and butyl thiol or a mixture of easily decomposable organic sulphur compounds. It is also possible to use refinery gas or liquid streams containing decomposable sulphur compounds.

It was surprisingly observed from the examples that with added sulphur compounds in the feed, resulting in sulphur contents of 100-10000 w-ppm in the feed the decarboxylation of short chain fatty acids and derivatives, such as $C_{16}$ fatty acids increases significantly more than that of $C_{18}$ fatty acids.

When $C_{16}$ containing fatty acids and derivatives thereof are hydrodeoxygenated, n-$C_{15}$ and n-$C_{16}$ paraffins are formed, with melting points of 9.9° C. and 18.2° C. respectively. The conversion of other vegetable oils like rapeseed oil and soybean oil produces almost totally n-$C_{17}$ and n-$C_{18}$ paraffins with significantly higher melting points of 22.0 and 28.2° C.

Hydrodeoxygenation of triglycerides facilitates controlled decomposition of the triglyceride molecule contrary to uncontrolled cracking. Double bonds are also hydrogenated during the controlled hydrotreatment. Light hydrocarbons and gases formed, mainly propane, water, CO2, CO, $H_2S$ and $NH_3$, are removed from hydrotreated product.

In the case the fresh feed comprises more than 5 wt-% free fatty acids, it is preferable to use diluting agent or product recycle in the process as described in FIG. 1, wherein an improved reactor configuration is presented, particularly for the control of the increase of temperature over catalyst bed and side reaction formation. In FIG. 1 a hydrotreatment process configuration is provided, comprising one or more catalyst beds in series, hydrotreated product recycle introduction on the top of the first catalyst bed and fresh feed, quench liquid and hydrogen introduction on top of each catalyst beds. This results in improved control of the reaction temperature in the catalyst beds and hence diminishes undesired side reactions.

In FIG. 1 the hydrotreatment reactor 100 comprises two catalyst beds 10 and 20. Fresh feed 11 is introduced as streams 12 and 13 on the catalyst beds 10 and 20, respectively, and hydrogen as stream 22 and 23 on the catalyst beds 10 and 20, respectively. The fresh feed stream 12 is first mixed with the hydrotreated product recycle stream 41 and quench liquid stream 43 and the resulting mixture 31, diluted in the fresh feed concentration, is then introduced on the catalyst bed 10. In order to obtain a required sulphur concentration in the feed stream 31, required amount of sulphur make up is added to the fresh feed stream 11 via stream 15. As mixture 31 passes through the catalyst bed 10 with the hydrogen stream 22, fatty acids and fatty acid derivatives of the fresh feed stream 12 are converted to the corresponding reaction products. A two-phase stream 32 is withdrawn from the bottom of the catalyst bed 10 and is mixed with the fresh feed stream 13, quench liquid stream 44 and the hydrogen stream 23. The formed vapor-liquid mixture 33, diluted in the fresh feed concentration, is then introduced on the catalyst bed 20 at reduced temperature due to cooling effect of the hydrogen, quench liquid and fresh feed, passed through the catalyst bed 20 and finally withdrawn from the catalyst bed as a product stream 34. The stream 34 is separated in to a vapor stream 35 and liquid stream 36 in the high temperature separator 101. Vapor stream 35 is rich in hydrogen and is directed to further treatment. Part of the liquid stream 36 is returned to the reactor 100 as recycle stream 40, which is further divided to dilution stream 41 and total quench liquid stream 42. The quench liquid stream 42 is cooled in the heat exchanger 102 to provide adequate cooling effect on the top of the catalyst beds 10 and 20. Hydrotreated product stream 51 is directed from the hydrotreatment step to further processing.

The catalyst beds 10 and 20 may be located in the same pressure vessel or in separate pressure vessels. In the embodiment where the catalyst beds are in the same pressure vessels the hydrogen streams 22 and 23 may alternatively be introduced on the catalyst bed 10 and then be passed through the catalyst beds 10 and 20. In the embodiment where the catalyst beds are in separate pressure vessels, the catalyst beds may operate in parallel mode with separate dilution streams, hydrogen streams and quench liquid streams. The number of catalyst beds may be one or two or more than two.

The sulphur make up to the hydrotreatment step may be introduced with the fresh feed stream 11. Alternatively, required amount of sulphur may be fed with the hydrogen streams 22 and 23 as gaseous sulphur component such as hydrogen sulphide.

Hydrogen is fed to the hydrotreating reactor in excess of the theoretical hydrogen consumption. During the hydrotreating step, triglyceride oils, fatty acids and derivatives thereof are almost theoretically converted to n-paraffins without or almost without side reactions. Additionally, propane is formed from the glycerol part of the triglycerides, water and CO and/or $CO_2$ from carboxylic oxygen, $H_2S$ from organic sulphur compounds and $NH_3$ from organic nitrogen compounds.

Using the above described procedures in the hydrotreating step, the temperature needed for reactions to start up is achieved in the beginning of each catalyst bed, the temperature increase in the catalyst beds is limited, harmful and partially converted product intermediates can be avoided and the catalyst life is extended considerably. The temperature at the end of the catalyst bed is controlled by net heat of reactions and to the extent of diluting agent used. Diluting agent may be any hydrocarbon available, bio-origin or non bio-origin. It can also be product recycle. If diluting agent is used, fresh feed content from total feed is less than 20 wt-%. If the product recycle is used, product recycle/fresh feed ratio is 5-30:1, preferably 10-30:1, most preferably 12-25:1. After the hydrotreatment step, the product is subjected to an isomerisation step.

Isomerisation of N-Paraffins Formed During Hydrotreatment

In order to improve the cold properties of the products, isomerisation of n-paraffins are needed. During the isomerisation branched isoparaffins are formed. Isoparaffins may typically have mono-, di-, tri- or tetramethyl branches.

The product obtained from the hydrotreatment step is isomerised with a catalyst under isomerisation conditions. The feed into the isomerisation reactor is a mixture of pure n-paraffins and the composition of the feed can be predicted from the fatty acid distribution of each individual bio oil used as feed to the hydrotreatment.

The isomerisation step may comprise an optional purification step, wherein the reaction product from the hydrotreatment step may be purified using a suitable method such as stripping with water vapour or a suitable gas such as light hydrocarbon, nitrogen or hydrogen. Preferably acid gases and water impurities are removed as completely as possible before the hydrocarbons are contacted with the isomerization catalyst.

In the isomerisation step, the pressure varies in the range of 2-15 MPa, preferably in the range of 3-10 MPa and the temperature varies between 200 and 500° C., preferably between 280 and 400° C.

In the isomerisation step, isomerisation catalysts known in the art may be used. Suitable isomerisation catalysts contain a molecular sieve and/or a metal selected from Group VIII of the Periodic Table and/or a carrier. Preferably, the isomerisation catalyst contains SAPO-11 or SAPO-41 or ZSM-22 or ZSM-23 or ferrierite and Pt, Pd or Ni and $Al_2O_3$ or $SiO_2$. Typical isomerisation catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$. Most of these catalysts require the presence of hydrogen to reduce the catalyst deactivation.

The isomerised diesel product consists mainly of branched hydrocarbons and also linear hydrocarbons and it has a boiling range of 180-350° C. Additionally some gasoline and gas may be obtained.

ADVANTAGES OF THE INVENTION

The process according to the invention provides a way to reduce the formation of higher molecular weight compounds during the hydrotreatment of the fresh feed, which may contain fatty acids and derivatives thereof. The process according to the invention provides selective manufacture of diesel range hydrocarbons from bio oils and fats with high diesel yield and without significant side-reactions. Branched hydrocarbons can be manufactured from plant and vegetable oils and fats as well as animal and fish oils and fats using promoted assistance of decarb-reactions during hydrodeoxygenation and therefore the consumption of hydrogen is decreased by 20-60%, typically 20-40%.

During the deoxygenation of the feed through decarboxylation and/or decarbonylation, oxygen is removed in the form of CO and $CO_2$. The decarb-reactions decrease hydrogen consumption, theoretically in complete deoxygenation about 60-70% compared to complete hydrodeoxygenation route, but depends on the triglyceride source. $C_{12}$-$C_{16}$ fatty acids and their derivatives have typically lower amount of double bonds and their decarboxylation tendency is lower than higher carbon number fatty acids and their derivatives during hydrodeoxygenation. However, it was surprisingly found that when 50-20000 w-ppm of sulphur, calculated as elemental sulphur, was present in the feed comprising fresh feed containing at least 20% by weight of $C_{12}$-$C_{16}$ fatty acids and/or their derivatives, the decarboxylation of $C_{16}$ fatty acids and derivatives thereof increases significantly more than that of $C_{18}$ fatty acids and its derivatives. This results in still lower consumption of hydrogen. Added sulphur compounds in hydrodeoxygenation feed facilitate the control of catalyst stability and reduce hydrogen consumption. Feedstock like palm oil or animal fat, containing more saturated fatty acid derivatives, produces less heat.

It was also found that feeds having a high content of $C_{12}$-$C_{16}$ fatty acids and/or their derivatives decreases hydrogen consumption in the isomerisation step and also improve cold properties of diesel fuel. The yield of diesel range hydrocarbons is especially increased during isomerisation of n-paraffins due to the lower cracking of n-paraffins formed from the fatty acid derivative feed to hydrotreatment. The $C_{11}$-$C_{16}$ n-paraffins formed during hydrotreatment need lower conversion and lower reaction temperature during isomerisation in order to maintain same cold properties of diesel and thus significantly lower the extent of cracking and coke formation compared to heavier n-paraffins. Alternatively improved cold properties can be achieved at the same reaction temperature without yield loss. The stability of the catalysts during hydrotreating and isomerisation is increased.

The invention is illustrated in the following with examples presenting some preferable embodiments of the invention. However, it is evident to a man skilled in the art that the scope of the invention is not meant to be limited to these examples.

EXAMPLES

Example 1

Effect of Sulphur Content of Total Feed

Palm oil containing 0.3 area-% of free fatty acids was used as the fresh feed, along with product recycle 5:1 in the presence of hydrogen. The content of triglyceride $C_{12}$-$C_{16}$ fatty acids in the fresh feed was 58.3 wt-%. The total feed contained alkaline and alkaline earth metals, calculated as elemental alkaline and alkaline earth metals in a amount of below 10 w-ppm. The amount of other metals, calculated as elemental metals, in the feed was below 10 w-ppm. The amount of phosphorus, calculated as elemental phosphorus was below 30 w-ppm.

During the test runs various amounts of dimethyl disulfide in the total feed were used. The reaction temperature was 305° C., reactor pressure was 5 MPa and space velocity was 0.5 g/g for fresh feed. Higher content of sulphur in feed significantly increased the total deoxygenation reactions through CO and $CO_2$ (decarb-reactions, production of one carbon less n-paraffins than original fatty acid) instead of deoxygenation by hydrogen (HDO, production of same carbon number n-paraffins than original fatty acid). However the decarb-reactions of C16-fatty acids increased significantly more than decarb-reactions of higher C18 or C20 fatty acids. High content of sulphur in the feed decreased the double bond hydrogenation activity of catalyst and also decreased decarb-reactions as can be seen from table 1, wherein the effect of sulphur content of total feed calculated as elemental sulphur, on decarb-% of different carbon number fatty acids observed in product oil (decarb-% calculated from fresh feed) is presented. Table 2 discloses relative increase of decarb-reactions compared to the feed with 100 w-ppm of sulphur and table 3 presents theoretical decrease of hydrogen consumption due to decarb-reactions.

TABLE 1

Effect of sulphur content of total feed calculated as elemental sulphur

|  | Sulphur 100 w-ppm | Sulphur 570 w-ppm | Sulphur 1000 w-ppm | Sulphur 3000 w-ppm | Sulphur 5000 w-ppm | Sulphur 10000 w-ppm |
|---|---|---|---|---|---|---|
| C15/(C15 + C16) | 29.1% | 45.6% | 52.6% | 55.1% | 56.2% | 47.5% |
| C17/(C17 + C18) | 30.2% | 37.5% | 40.1% | 42.5% | 43.3% | 39.7% |
| C19/(C19 + C20) | 36.6% | 43.4% | 46.0% | 48.1% | 49.2% | 46.5% |
| Total decarb-% | 32.0% | 42.2% | 46.2% | 48.6% | 49.5% | 44.6% |

TABLE 2

Relative increase of decarb-reactions

|  | Sulphur 570 ppm vs 100 ppm | Sulphur 1000 ppm vs 100 ppm | Sulphur 3000 ppm vs 100 ppm | Sulphur 5000 ppm vs 100 ppm | Sulphur 10000 ppm vs 100 ppm |
|---|---|---|---|---|---|
| C16 | 56.8% | 80.9% | 89.5% | 93.2% | 63.3% |
| C18 | 24.1% | 32.7% | 40.7% | 43.2% | 31.4% |
| C20 | 18.7% | 25.7% | 31.5% | 34.4% | 27.1% |
| Total | 31.9% | 44.6% | 52.0% | 55.0% | 39.5% |

TABLE 3

Theoretical hydrogen consumption with and without decarb-reactions

|  | Rapeseed oil | Palm stearin | Palm oil | Animal fat |
|---|---|---|---|---|
| Hydrogen consumption ($H_2$ molecules per triglyceride), 100% dehydrogenation by hydrodeoxygenation | | | | |
| Water | 6 | 6 | 6 | 6 |
| Subst. Hydrogen | 6 | 6 | 6 | 6 |
| Double bonds | 4 | 1.16 | 1.8 | 2 |
| Ttotal | 16 | 13.16 | 13.8 | 14 |
| Hydrogen consumption ($H_2$ molecules per triglyceride), 100% deoxygenation by decarb-reactions | | | | |
| Water | 0 | 0 | 0 | 0 |
| Subst. Hydrogen | 3 | 3 | 3 | 3 |

TABLE 3-continued

Theoretical hydrogen consumption with and without decarb-reactions

|  | Rapeseed oil | Palm stearin | Palm oil | Animal fat |
|---|---|---|---|---|
| Double bonds | 4 | 1.16 | 1.8 | 2 |
| Total | 7 | 4.16 | 4.8 | 5 |
| H2 reduction (max) | 56% | 68% | 65% | 64% |

Example 2

Effect of C16 Fatty Acids on Cracking During Isomerisation and Diesel Yield at Same Pour Point Level with Palm Oil Feed Palm oil containing 44.8 wt-% of triglyceride $C_{12}$-$C_{16}$ fatty acids was used in the fresh feed. Dimethyl disulphide was added to palm oil to obtain sulphur content of about 600 w-ppm in the feed, calculated as elemental sulphur. The feed purity was same as in example 1, but the amount of free fatty acids was 0.2 area-%. No diluting agent was used. The feed was hydrotreated at 305° C. in the presence of hydrogen, reactor pressure was 5 MPa and space velocity was 2 g/g for fresh feed. The products contained mainly n-paraffins. The n-paraffin feeds were isomerised at 317° C., 4 MPa and WHSV was 3 l/h in presence of hydrogen. The catalyst (A) contained Pt, SAPO-11 and an alumina support. The amount of hydrocarbons >C10 was 97 wt-% in the product. The cloud point of the liquid product was −22° C. Results of analysis of the product are provided in table 4.

A comparative test was carried out with rapeseed oil feed. Rapeseed oil contained of 4.5 wt-%. of triglyceride $C_{12}$-$C_{16}$ fatty acids. Rapeseed oil was hydrotreated and isomerised at the same reaction conditions as described above. The amount of hydrocarbons >C10 was 96 wt-% in the product. The cloud point of the liquid product was −15° C. Results of analysis of the product are provided in table 4.

Example 3

Effect of C16 Fatty Acids on Pour Point of Isomerised Diesel Oil at Same Diesel Yield with Palm Oil Feed The hydrotreated palm oil obtained in Example 2 was isomerised at 312° C., 4 MPa and WHSV was 3 l/h in the presence of hydrogen with catalyst A. This yielded a liquid product with a cloud point of −14° C. The amount of hydrocarbons >C10 was now 98 wt-% in the product. A small amount of lighter hydrocarbons can be concluded from the flash point and in the distillation curve of the products as can be seen from table 4, which presents analysis results of hydrotreated and isomerised products from rapeseed oil and palm oil, and HRO=hydrotreated rapeseed oil, HPO=hydrotreated palm oil.

TABLE 4

Analysis results of hydrotreated and isomerised products from rapeseed oil and palm oil.

| Feed | Method | Unit | HRO | HPO | HPO |
|---|---|---|---|---|---|
| Isomerisation T |  | ° C. | 317 | 317 | 312 |
| Density 15° C. | EN ISO 12185 | kg/m³ | 782.7 | 779.2 | 779.3 |
| Cloud point | ASTM D5773 | ° C. | −15 | −22 | −14 |
| Pour point | ASTM D5949 | ° C. | −24 | −33 | −24 |
| CFPP | EN 116 | ° C. | −15 | −22 | −15 |
| Flash point | EN 22719 | ° C. | 52 | 53 | 65 |
| Distillation | TA | ° C. | 117 | 123 | 185 |
| EN ISO 3405 | 5 vol-% | ° C. | 274 | 264 | 268 |
|  | 10 vol-% | ° C. | 282 | 270 | 274 |
|  | 30 vol-% | ° C. | 290 | 279 | 280 |
|  | 50 vol-% | ° C. | 292 | 283 | 283 |
|  | 70 vol-% | ° C. | 294 | 287 | 287 |
|  | 90 vol-% | ° C. | 299 | 294 | 294 |
|  | 95 vol-% | ° C. | 306 | 298 | 299 |
|  | TL | ° C. | 327 | 311 | 308 |

Example 4

Effect of C16 Fatty Acids on Cracking During Isomerisation and Diesel Yield at Same Pour Point Level with Animal Fat Feed Animal fat containing 30 wt-% of triglyceride C12-C16 fatty acids was used as fresh feed. The feed contained alkaline and alkaline earth metals, calculated as elemental alkaline and alkaline earth metals in the amount of below 10 w-ppm. The amount of other metals, calculated as elemental metals, in the feed was below 10 w-ppm. The amount of phosphorus, calculated as elemental phosphorus was below 30 w-ppm. Dimethyl disulphide was added to animal fat to obtain sulphur content of about 100 w-ppm in the feed. Fresh feed contained free fatty acids 0.6 area-%. The feed was hydrotreated at 300° C. in the presence of hydrogen, reactor pressure was 5 MPa and space velocity was 2 g/g for fresh feed without any diluting agent. The products contained mainly n-paraffins. The n-paraffin feeds were isomerised at 316° C., 4 MPa and WHSV was 1.5 l/h in the presence of hydrogen. The catalyst (B) contained Pt, SAPO-11 and an alumina support. The amount of hydrocarbons >C10 was 95 wt-% in the product. The cloud point of the liquid product was −20° C.

As a comparative example, rapeseed oil was hydrotreated and isomerisated at the same reaction conditions as described above. Rapeseed oil contained 4.5 wt-% of triglyceride C12-C16 fatty acids. In the isomerised product, the amount of hydrocarbons >C10 was 95 wt-%. The cloud point of the liquid product was −14° C.

Example 5

Effect of C16 Fatty Acids on Pour Point of Isomerised Diesel Oil at Same Diesel Yield with Animal Fat Feed The hydrotreated animal fat obtained in Example 4 was isomerised at 312° C., 4 MPa and WHSV was 1.5 l/h in the presence of hydrogen with catalyst B. This yielded a liquid product with a cloud point of −13° C. The amount of hydrocarbons >C10 was now 98 wt-%.

The invention claimed is:

1. A process for the manufacture of diesel range hydrocarbons, wherein total feed comprising fresh feed is hydrotreated in a hydrotreating step to form a hydrotreated product, and the hydrotreated product is isomerised in an isomerisation step to form diesel range hydrocarbons, and wherein the fresh feed comprises at least 20% by weight of triglyceride $C_{12}$-$C_{16}$ fatty acids, $C_{12}$-$C_{16}$ fatty acid esters, $C_{12}$-$C_{16}$ fatty acids, or combinations thereof,
 wherein at least one inorganic or organic sulphur compound or a refinery gas and/or liquid stream containing sulphur compounds is added to the total feed or fresh feed to give a total feed comprising 100-10,000 w-ppm sulphur calculated as elemental sulphur,
 wherein during the hydrotreating step, the pressure is in the range of 2-15 MPa, and the temperature is between 200 and 400° C., and
 wherein during the isomerisation step, the pressure is in the range of 2-15 MPa, and the temperature is between 200 and 500° C.

2. The process according to claim 1, wherein the fresh feed contains at least 30% by weight of triglyceride $C_{12}$-$C_{16}$ fatty acids $C_{12}$-$C_{16}$ fatty acid esters, $C_{12}$-$C_{16}$ fatty acids, or combinations of thereof.

3. The process according to claim 1, wherein the fresh feed contains more than 5% by weight of free fatty acids.

4. The process according to claim 1, wherein the total feed contains less than 10 w-ppm alkaline and alkaline earth metals, calculated as elemental alkaline and alkaline earth metals, less than 10 w-ppm other metals, calculated as elemental metals, and less than 30 w-ppm phosphorus, calculated as elemental phosphorus.

5. The process according to any one of claims 1-4, wherein the total feed comprises less than 20 wt-% of fresh feed and additionally at least one diluting agent.

6. The process according to claim 5, wherein the diluting agent is a diluting agent selected from hydrocarbons and recycled products of the process or mixtures thereof and the diluting agent/fresh feed-ratio is 5-30:1.

7. The process according to claim 1, wherein the total feed contains 1000-8000 w-ppm of sulphur calculated as elemental sulphur.

8. The process according to claim 1, wherein the fresh feed is of biological origin selected from plant oils/fats, animal fats/oils, fish fats/oils, fats contained in plants bred by means of gene manipulation, recycled fats of the food industry and mixtures thereof.

9. The process according to claim 1, wherein the fresh feed is selected from rapeseed oil, colza oil, canola oil, tall oil, sunflower oil, soybean oil, hempseed oil, olive oil, linseed oil, mustard oil, palm oil, peanut oil, castor oil, coconut oil, lard, tallow, train oil, fats contained in milk and mixtures thereof.

10. The process according to claim 1, wherein the fresh feed comprises feed of biological origin and hydrocarbon or hydrocarbons.

11. The process according to claim 1, wherein in the hydrotreatment step a catalyst bed system is used comprising one or more catalyst beds.

12. The process according to claim 1, wherein the hydrotreatment is carried out in the presence of a hydrogenation catalyst, said hydrogenation catalyst containing a metal from the Group VIII and/or VIB of the Periodic System.

13. The process according to claim 12, wherein the hydrotreating catalyst is a supported Pd, Pt, Ni, NiMo or a CoMo catalyst, the support being alumina and/or silica.

14. The process according to claim 1, wherein an isomerisation catalyst containing molecular sieve is used in the isomerisation step.

15. The process according to claim 14, wherein the isomerisation catalyst comprises a metal from Group VIII of the Periodic System.

16. The process according to claim 14, wherein the isomerisation catalyst contains $Al_2O_3$ or $SiO_2$.

17. The process according to claim 14, wherein the molecular sieve is selected from SAPO-11, SAPO-41, ZSM-22, ZSM-23, and ferrierite.

18. The process according to claim 15, wherein the metal is selected from Pt, Pd and Ni.

19. The process according to claim 1, wherein the fresh feed contains at least 40% by weight of triglyceride $C_{12}$-$C_{16}$ fatty acids $C_{12}$-$C_{16}$ fatty acid esters, $C_{12}$-$C_{16}$ fatty acids, or combinations thereof.

20. The process according to claim 5, wherein the diluting agent/fresh feed-ratio is 10-30:1.

21. The process according to claim 5, wherein the diluting agent/fresh feed-ratio is 12-25:1.

22. The process according to claim 1, wherein the total feed contains 2000-5000 w-ppm of sulphur calculated as elemental sulphur.

23. The process according to claim 1, wherein during the hydrotreating step, the pressure is in the range of 3-10 MPa, and the temperature is between 250 and 350° C.

24. The process according to claim 1, wherein during the isomerisation step, the pressure is in the range of 3-10 MPa, and the temperature is between 280 and 400° C.

* * * * *